United States Patent
Conway-Jones et al.

(10) Patent No.: US 7,543,038 B2
(45) Date of Patent: Jun. 2, 2009

(54) ARRANGEMENT AND METHOD FOR IMPERMANENT CONNECTIVITY

(75) Inventors: David C Conway-Jones, Winchester (GB); Andrew J Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 10/713,737

(22) Filed: Nov. 13, 2003

(65) Prior Publication Data

US 2005/0021667 A1   Jan. 27, 2005

(30) Foreign Application Priority Data

Apr. 10, 2003   (GB) ................... 0308277.3

(51) Int. Cl.
   *G06F 15/16*   (2006.01)
(52) U.S. Cl. ....................... 709/217; 709/203
(58) Field of Classification Search ........................ None
   See application file for complete search history.

(56) References Cited

U.S. PATENT DOCUMENTS 6,006,269 A * 12/1999 Phaal .................. 709/227
6,163,779 A * 12/2000 Mantha et al. .............. 707/100
6,507,867 B1 * 1/2003 Holland et al. .............. 709/219
6,895,425 B1 * 5/2005 Kadyk et al. ................. 709/203
6,996,599 B1 * 2/2006 Anders et al. ............... 709/201
7,188,183 B1 * 3/2007 Paul et al. ................... 709/229
2003/0009538 A1 * 1/2003 Shah et al. .................. 709/219

* cited by examiner

*Primary Examiner*—John B. Walsh
(74) *Attorney, Agent, or Firm*—Yee & Associates, P.C.; David A. Mims, Jr.

(57) ABSTRACT

A method and arrangement (100) for impermanent connectivity between a client unit (110) and a server (120) in a network, comprising: at the client unit, a client proxy function (114) for receiving information from/for a client application (112), for storing said information, and for relaying said information between the client unit and the server when a connectivity link (130) therebetween is established. The arrangement may further comprise a server proxy function (124), and a messaging subsystem (116, 122). The information may be SMTP, POP3, HTTP or FTP information. An FTP file 'GET' command may be performed by, in response to the 'GET' command, writing a local file at the client unit having a unique signature, and when the connectivity link is established, obtaining the requested file from the server, finding the file at the client unit having the unique signature, and overwriting the found file with the obtained file. This provides the advantages that:
   client application code does not have to be modified
   operation is largely invisible to the client.

11 Claims, 6 Drawing Sheets

ARRANGEMENT AND METHOD FOR IMPERMANENT CONNECTIVITY

FIELD OF THE INVENTION

This invention relates to impermanently connected computing environments, and particularly (though not exclusively) to pervasive computing devices such as hand-held or palm-sized portable computing devices.

BACKGROUND OF THE INVENTION

With the advent of pervasive computing devices such as hand-held or palm-sized computing devices, and operating systems (e.g., Microsoft PocketPC®) which offer a significant subset of the familiar desktop based computing environment (e.g., Windows 2000®), there is a tendency to make familiar applications available on the pervasive platform.

A good example is the 'POP3' (Post Office Protocol version 3) mail client (such as found, e.g., in common applications such as Outlook Express™, or Netscape Messenger™), which allows email to be sent and received by the palmtop device. The problem with this is that the present applications are not really suitable to work in the unique connectivity environment of pervasive devices. This is because pervasive devices' unique connectivity environment lacks a ubiquitous wireless network with broad coverage which allows an "always connected" mode of operation. Instead, the pervasive devices connect at infrequent intervals to perform "online tasks", and are disconnected for the rest of the time.

Asynchronous messaging products such as IBM's 'WebSphere MQ'® and 'WebSphere MQ Everyplace'® seek to insulate application programmers from having to worry about whether they are connected or not at any given time by offering a queuing mechanism which will take the message from the application (so the application can forget about it), and hold it until a later time when connectivity is available and the message can be delivered to its destination on a remote machine.

Unfortunately, the writers of most "user" applications (e.g., POP3 and 'SMTP' mail clients, ftp clients, Web browsers, etc.) did not have this model in mind when they wrote the applications, since they assume the existence of a client-server connection at the time the application performs its sending or receiving function.

Currently there are two approaches in use: (1) the pervasive device has to be connected to the network when the command is issued in the client application which causes it to make a client-server connection to a remote server, or (2) a custom application has to be written, which makes explicit use of an asynchronous messaging system and have the flow of interactions with the user redesigned to fit into an asynchronous model where the reply is not likely to come back for a significant time, i.e., make it into a "batch submission" system.

Neither of these approaches is satisfactory in the pervasive device environment with today's "not always connected" networking infrastructure.

A need therefore exists for a method and arrangement for impermanent connectivity wherein the abovementioned disadvantage(s) may be alleviated.

STATEMENT OF INVENTION

In accordance with aspects of the present invention, there is provided an arrangement and a method for impermanent connectivity between a client unit and a server in a network. The arrangement includes, at the client unit, a client proxy for receiving information to be sent to the server and for which a server response is to be received from the server, for storing the information, and for sending a substitute response for the server response; and relaying means for relaying the information from the client proxy at the client unit to the server responsive to a connectivity link between the client unit and the server being established.

This invention enables a variety of standard client-server applications to be used in a "not always connected" environment, without modification to those applications.

BRIEF DESCRIPTION OF THE DRAWING(S)

One method and arrangement for impermanent connectivity incorporating the present invention will now be described, by way of example only, with reference to the accompanying drawing(s), in which.

DESCRIPTION OF PREFERRED EMBODIMENT(S)

Figure 1:
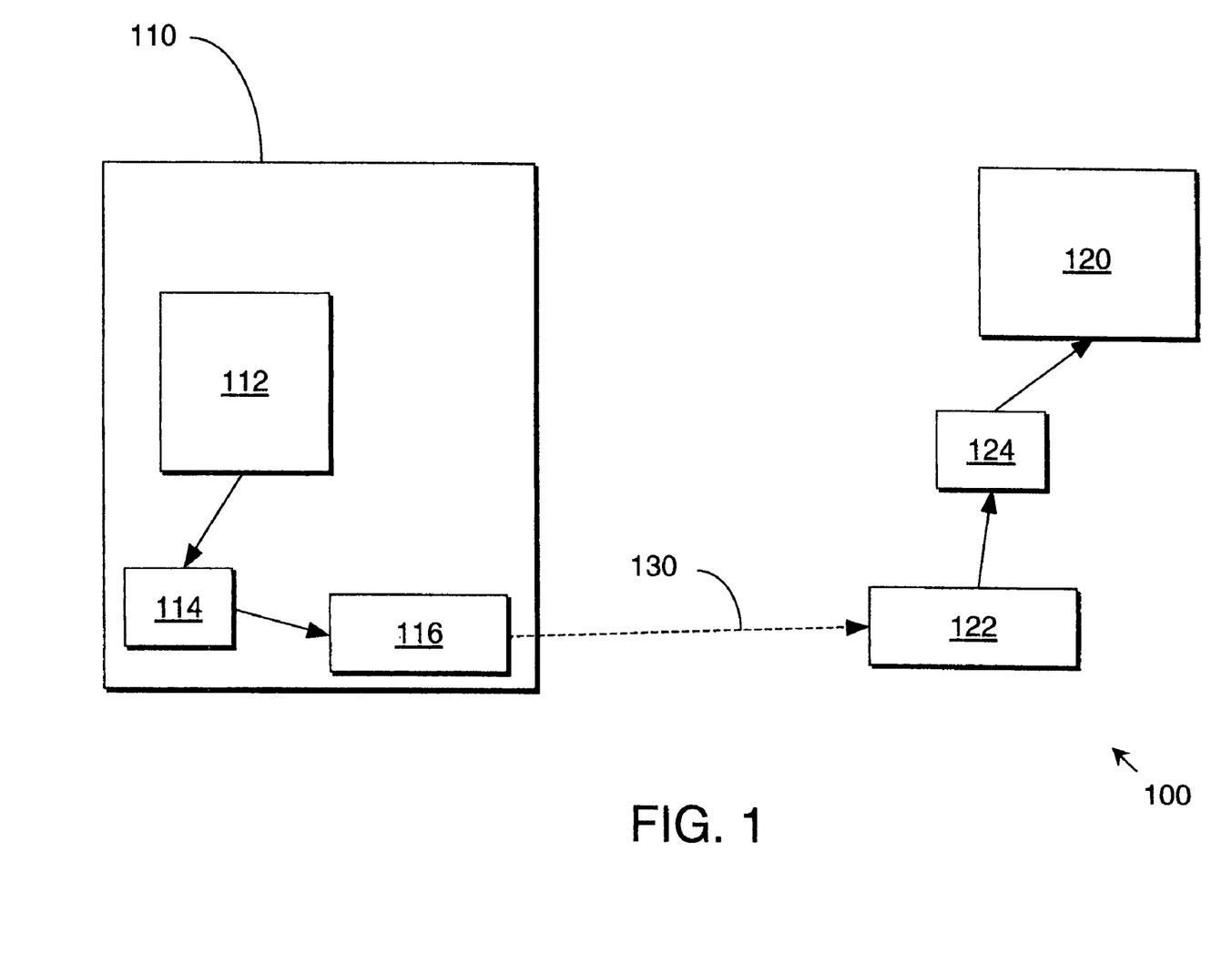
FIG. 1 shows a block diagram illustrating a networked computing system including pervasive, hand-held computing devices and utilising the present invention.

Referring firstly to FIG. 1, a networked computing system 100 includes a "client" pervasive computing device such as a portable, hand-held computer 110 and a server 120. The pervasive device 110 and the server 120 are linked by a wired or wireless link 130, which may typically be impermanent, i.e., "not always on".

The pervasive device 110 runs a software application 112, which communicates with the server 120 (via a "client proxy" function 114 and a messaging function incorporating an asynchronous, queue-based client messaging function 116 in the pervasive device 110 and via a server messaging function 122 and an "end point proxy" function 124 associated with the server 120) as will be explained in greater detail below. The "client proxy" function 114 is typically provided as a software application. The messaging function including the asynchronous (queue-based)messaging function 116 and the server messaging function 122 may conveniently be provided by client and server modules respectively of IBM's 'WebSphere MQ'® messaging software.

Simply stated, the purpose of the "client proxy" function 114 is to give the client application 112 (e.g., an SMTP—Simple Mail Transfer Protocol—email client) the impression that it is connected to a real SMTP server, but because the communication link 130 from the pervasive device may well be down, the "client proxy" function 114 can't simply proxy the data from the client 112 through to the server 120, as that network path might not be established that time. So instead, the "client proxy" function 114 gives "plausible" responses to the client 112, to allow the client 112 to complete the operation it intended to perform (e.g., send an email message). The "client proxy" function 114 then has the responsibility of completing the action that the client 112 has now been "deceived" into thinking it has successfully performed. This involves queuing one or more messages into the client messaging function 116, which at some point in the future, when connectivity is established, transfers the message(s) ultimately to the "end point proxy" 124 via server messaging function 122. Upon receipt of one or more messages which make up a complete action (e.g., the sending of an email), the "end point proxy" 124 establishes a client-server connection to the real destination server 120 (in this example an SMTP server), and delivers the message to it. All handshaking between the "end point proxy" 124 and the server 120 is private to that connection, and does not have to be relayed back to the client 110, since the client 110 already thinks it has completed the action, so is not expecting any response.

Clearly, the way the "subterfuge" operates will vary from one client application to another, and so a custom module for the "client proxy" 114 will have to be provided for each client-server protocol that is to be supported by this mechanism.

With this mechanism in place, the client (an email client in this example) would be configured to talk to an SMTP server on "localhost", i.e., looped back to that pervasive device itself, rather than to a remote SMTP server as would usually be configured. This does not constitute a modification to the client application program, merely a configuration change which can be made very easily. The user of the pervasive device would type in their email message, issue a "send" command, and the client device 110 would display something like "sending . . . ", then "message sent". The client (and the user) are led to believe that the message has genuinely been sent. However the transfer of the email message from the pervasive device (via, for example, 'WebSphere MQEveryplace' messaging system 116 and 122 and the endpoint proxy 124) to the SMTP server 120 which can actually process the message for forwarding to its recipients, only happens at some later time when a communication link is established.

One feature which may be included in the client proxy 114, is a notification service. This is a mechanism whereby, on receipt of a message from the client messaging function 116 from a remote application 124, via server messaging function 122, a message can be made visible to the user of the device. This might be a pop-up window alert, or a line added to a scrolling status window on an application which is open on the device screen (not shown). This might be used to notify the user of the pervasive device 110 (rather than the client application 112), that the action has been genuinely completed, e.g., that the email that was sent some time ago has, in fact, now been delivered to the remote SMTP server and is on its way. This enables the user to know when the asynchronous actions have completed. This is made use of in various ways in the examples below.

Clearly not all client-server applications or protocols are amenable to this treatment, but some of the most commonly used protocols are. Clearly an interactive connection, such as telnet, can not be emulated in this way, since the asynchronous version of this is nonsensical.

Four applications which can benefit from this treatment are now described, and the sequence of events is explained which leads to the application client being led to believe it has completed its task, even though no path to the remote server exists. The examples are not exhaustive, and the general principles can be applied to many other client-server protocols. It should be noted that in all the examples the client application code does not have to be modified.

SMTP (Outgoing Mail)

Figure 2:
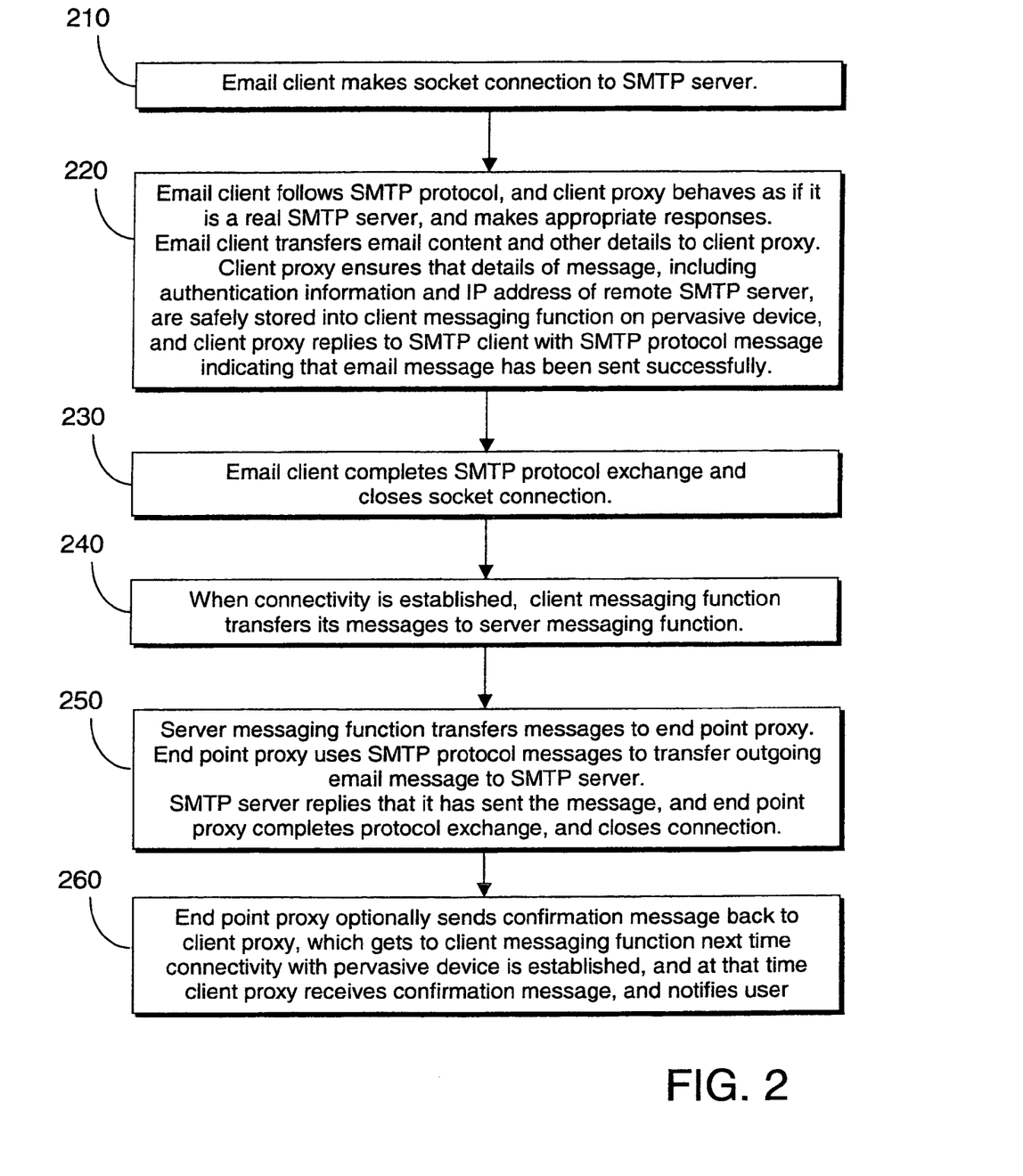
FIG. 2 shows a flow chart illustrating steps performed in an SMTP (outgoing mail) process in the system of FIG. 1.

Referring now also to FIG. 2, this is the example mentioned above, but to be more rigorous it is described here. As shown at step 210, an (email) client 112, when told to "send" its message, makes a socket connection to the SMTP server that has been configured, in this case it is a "local" SMTP server, in the form of the client proxy 114, listening on the SMTP "well known" port (25).

The client proxy 114 has a configuration capability, where the IP (Internet Protocol) address (and optionally port) of the remote (SMTP) server 120 can be configured. As shown at step 220, the client 112 follows the SMTP protocol, and the client proxy 114 behaves as if it is a real SMTP server, and makes the appropriate responses. The client 112 transfers the email content and other details to the client proxy 114. The client proxy 114 ensures that the details of the message, including authentication information (as provided by the client 112) and the IP address (and optionally port) of the remote (SMTP) server 120, are safely stored into the client messaging function 116 on the pervasive device 110, and then the client proxy 114 replies to the SMTP client 112 with the SMTP protocol message which indicates that the message has been sent successfully.

As shown at step 230, the client 112, believing it has completed its task then completes the SMTP protocol exchange and closes the socket connection.

As shown at step 240, at some point in the future, connectivity is established, and the client messaging function 116 transfers its messages to the server messaging function 122. End point proxy 124 is waiting for such messages to arrive from the server messaging function 122, and when they arrive, the end point proxy 124 takes them and performs a role very similar to that which the client application 112 performed when it was talking to the client proxy 114, i.e., it is an SMTP client talking to an (SMTP) server 120. The end point proxy 124 uses the SMTP protocol to contact a pre-configured SMTP server, and uses SMTP protocol messages to transfer the outgoing message to the server 120. The server 120 replies that it has sent the message, the end point proxy 124 completes the protocol exchange, and closes the connection.

At this point, the end point proxy 124 does not need to do anything else, since client the client 112 is already satisfied that it has completed its task; however, the user of the pervasive device may wish to know that the message has really been sent, so in this case, as shown at step 250, the end point proxy 124 sends a message back to the client proxy, via the messaging system (122 then 116), which gets to the client messaging function 116 next time the pervasive device establishes connectivity. At that time, the client proxy 114 receives the confirmation message, and can either pop up a notification message for the user, or can add it to a status window in an on-screen display, for the user to check at their convenience. It might also "beep" to signal that something has arrived.

POP3 (Incoming Mail)

Figure 3:
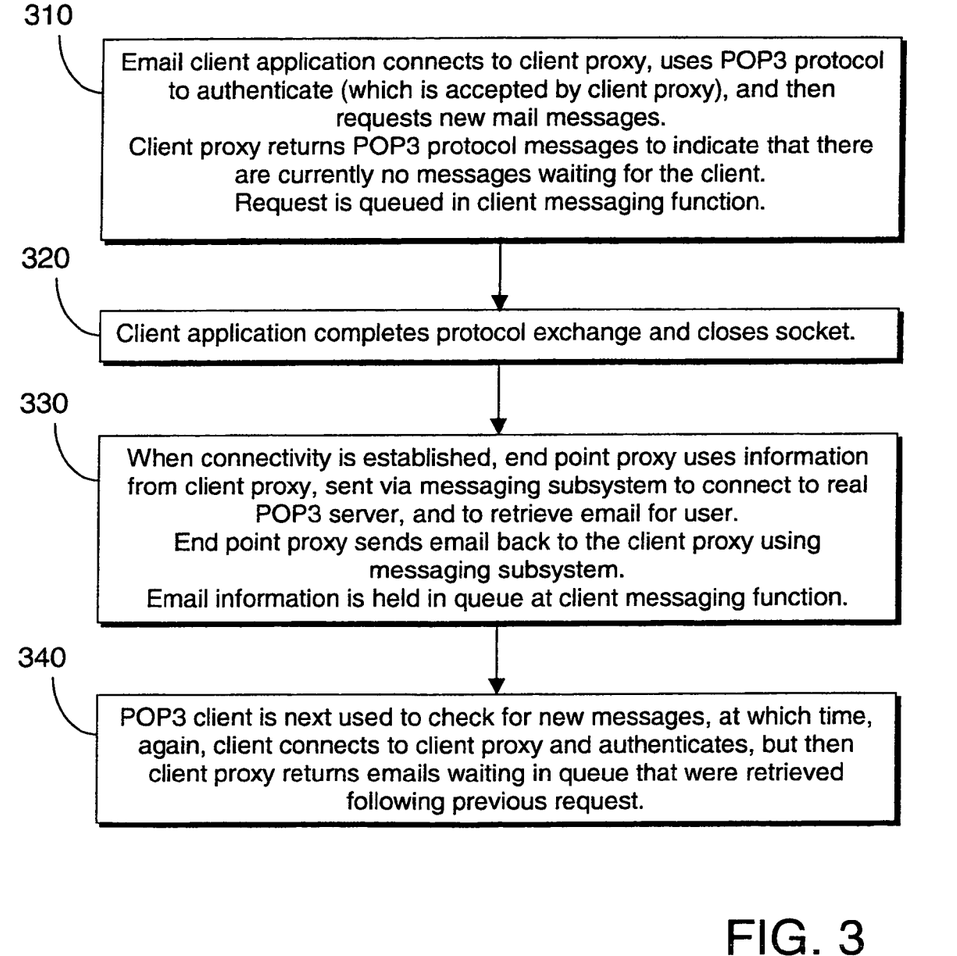
FIG. 3 shows a flow chart illustrating steps performed in a POP3 (incoming mail) process in the system of FIG. 1.

Referring now also to FIG. 3, an email client, when asked to "get new messages" uses the 'POP3' protocol to connect to a POP3 server, identify itself, using the username and password of the user, and then receive the emails that are awaiting that user on the server.

In this proposed scheme, the client application 112 is configured to talk to a POP3 server on "localhost" (the pervasive device). As shown at step 310, the client application 112 connects to the client proxy 114, uses the POP3 protocol to authenticate (which is accepted by the client proxy), and then requests new mail messages. The client proxy 114 returns POP3 protocol messages to indicate that there are currently no messages waiting for the client.

As shown at step 320, the client application 112 then completes the protocol exchange and closes the socket.

The client proxy 114 has a configuration capability, where the IP address (and optionally port) of the real POP3 server is stored and, as shown at step 330, this information is sent through the messaging subsystem (116 then 122 when the link is established) to the end point proxy, where the end point proxy makes use of this information to connect to the real POP3 server 120, and uses the login information to retrieve the email for that user. It then sends it back to the client proxy using the messaging subsystem (122 then 116, when the link is established). The information is held in a queue at the client messaging function until next time the POP3 client is used to check for new messages.

As shown at step 340, when the POP3 client is next used to check for new messages, again, the client 112 connects to the client proxy 114, and authenticates, but then the client proxy returns the emails that are waiting in the queue that were retrieved following the previous request.

Thus the sequence is always "one step behind" what would be seen if the client was connected directly to the real POP3 server, but in practice this is unlikely to be noticeable.

The arrival of mail at the client proxy 114 when the link is established could cause a notification alert to the user to indicate that mail has arrived, thus encouraging the user to "get new messages" again, using the client application 112, to see the incoming mail.

FTP (File Transfer Protocol)

For FTP, the proxying process is broken into two parts: 'PUT' (described below with reference to FIG. 4) and 'GET' (described below with reference to FIG. 5).

Figure 4:
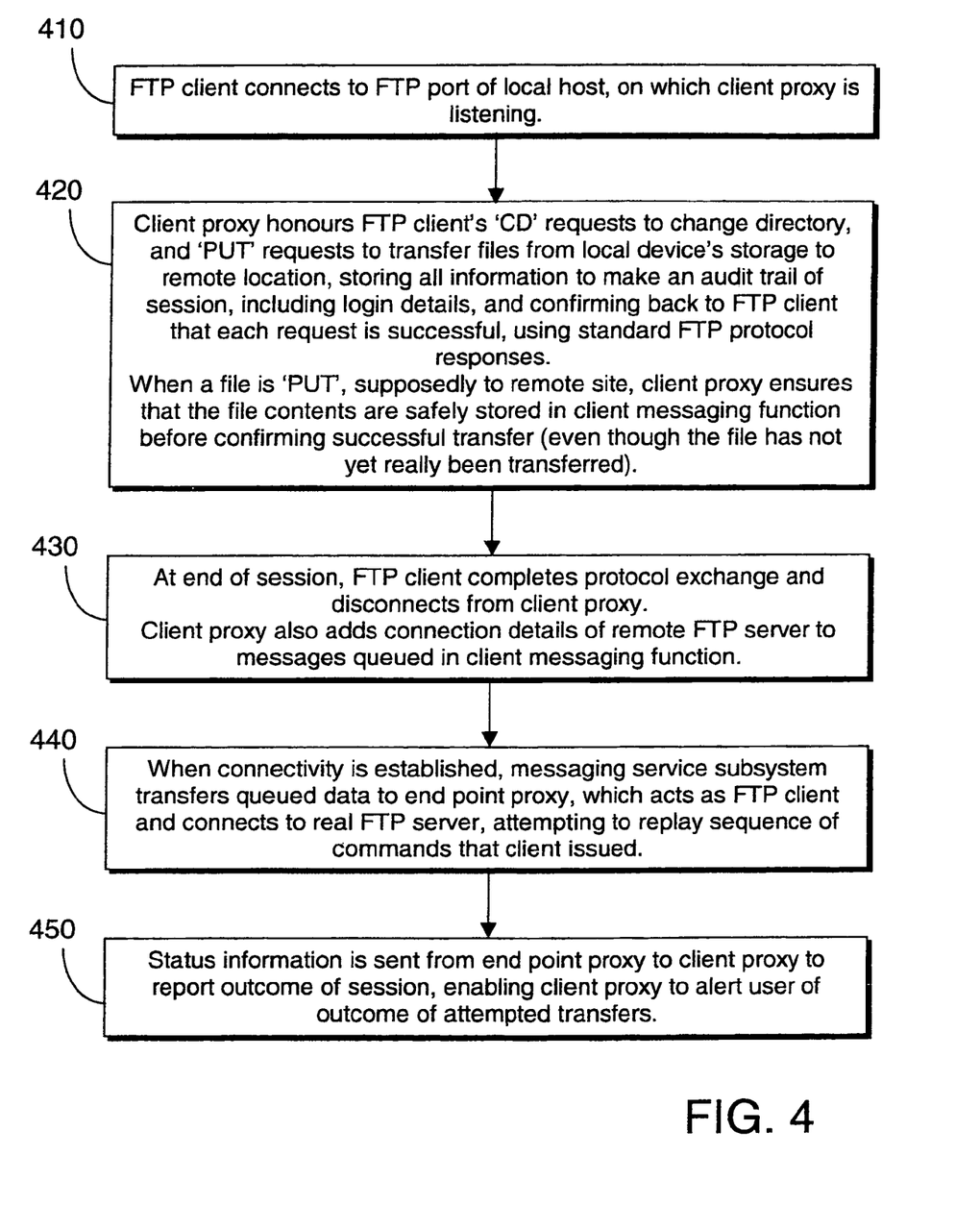
FIG. 4 shows a flow chart illustrating steps performed in an FTP (file transfer protocol) file 'PUT' process in the system of FIG. 1.

Referring now to FIG. 4, the client proxy 114 implements a subset of the ftp protocol (certain commands like DIR don't make sense in this environment), and has a configuration capability where the user can set the real ftp server 120 that is to be connected to by end point proxy 124.

For a file PUT, as shown at step 410, the ftp client 112 on the pervasive device connects to the ftp port of the local host, which is where the client proxy 114 is listening.

As shown at step 420, the client proxy 114 then appears to the ftp client 112 as a very receptive ftp site—honouring CD requests to change directory, and PUT requests to transfer files from the local device's storage to the remote location. The client proxy 114 stores all this information into client messaging function 116 as one or more messages, to make an audit trail of the session, including the login details (username and password), and confirms back to the ftp client 112 that each request is successful, using the standard FTP protocol responses. When a file is PUT, supposedly to the remote site, the client proxy 114 ensures that the file contents are safely stored in the underlying client messaging function 116 before confirming successful transfer (even though the file has not yet been transferred in reality).

As shown at step 430, at the end of the session, the ftp client 112 completes the protocol exchange and disconnects from the client proxy. The client proxy 114 also adds connection details of the remote ftp server to the messages queued in the client messaging function 116.

As shown at step 440, at some point in the future, connectivity is established, the messaging subsystem transfers the data (116 to 122), and it reaches the end point proxy, where the end point proxy 124 acts as an ftp client and connects to the real ftp server 120, and attempts to "replay" the sequence of commands that the client issued. Hopefully these will all succeed, though it is possible that because the client was navigating "blind" in the directory tree, over on the pervasive device, or file permissions might not allow the requested operation, or various other exceptional conditions, that the replay could be terminated early.

As shown at step 450, status information is then sent from the end point proxy 124 to the client proxy 114 (via 122 and 116) to report the outcome of the session. This would enable the client proxy to alert the user of the outcome of the attempted transfers.

Figure 5:
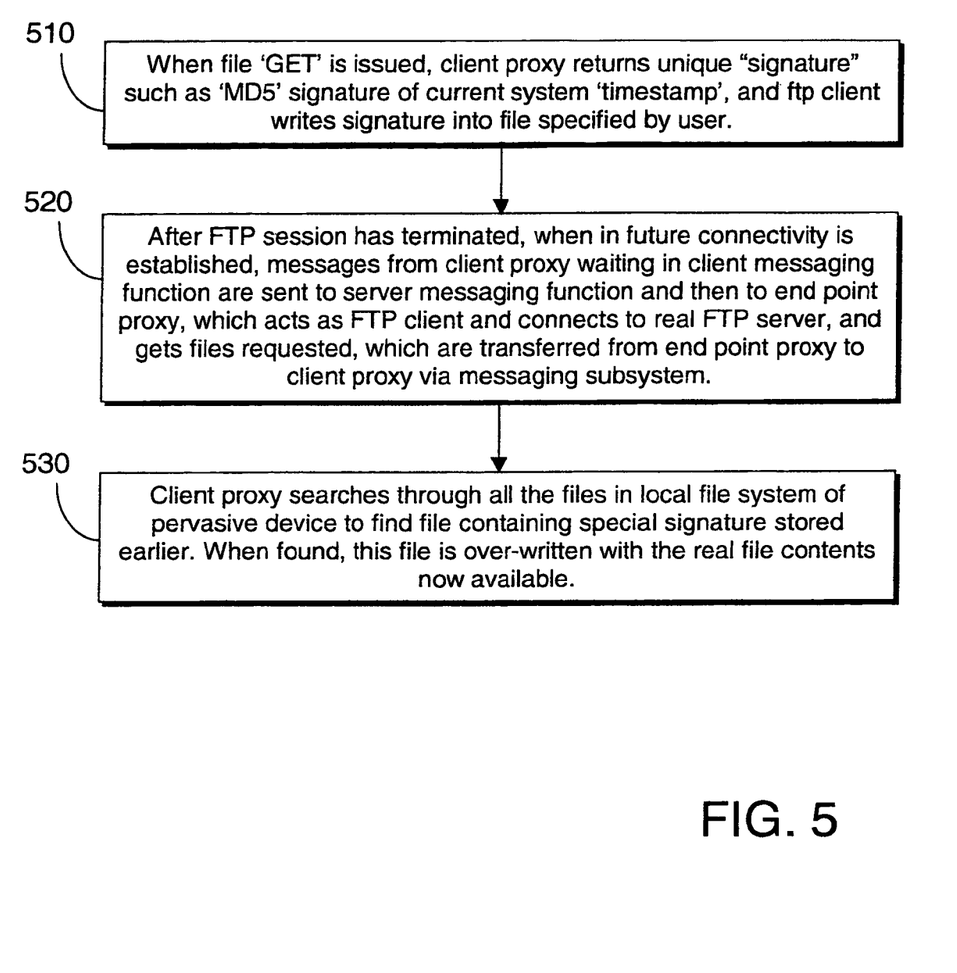
FIG. 5 shows a flow chart illustrating steps performed in an FTP (file transfer protocol) file 'GET' process in the system of FIG. 1.

Referring now to FIG. 5, for a file GET, a novel solution is employed. Most of this is very similar to the PUT process described above, but when a GET is performed, the ftp client 112 will have started in a certain directory on the local machine, and can then optionally use LCD (Local Change Directory) commands in the client to move to another directory, then when a file GET command is issued, the file content being transferred from the remote ftp server goes into the file in that directory. The problem is that only the ftp client knows the directory and filename that is being written to. The proposed solution to this is that, as shown at step 510, when the file GET is issued, the client proxy returns some "bogus" file contents. This is in fact a special "signature", e.g. an 'MD5' (the well-known 'fingerprinting' algorithm) signature of the current system 'timestamp', or something that gives a string of characters that is substantially guaranteed to be unique. The ftp client 112 writes this into the file specified by the user.

The only thing obviously "wrong" with this file, apart from the requested data not being stored there, is that the number of bytes would not be correct, compared with the size of the real file that was being requested.

As shown at step 520, after the ftp session has terminated, at some point in the future, the link 130 gets connected, the messages from the client proxy waiting in the client messaging function 116 go to the server messaging function 122 and then on to the end point proxy 124. The end point proxy 124 acts as an ftp client, and connects out to the real ftp server 120 (as configured by the user in the client proxy 114), and gets the requested files. These are transferred from the end point proxy 124 to the client proxy 114 (via the messaging subsystem 122 and 116) when the link 130 is connected, and the client proxy 114 now has the real file contents.

As shown at step 530, the client proxy now initiates a search through all the files in the local file system (not shown) of the pervasive device 110, opening each file and looking to see which one contains that special "signature" that was delivered to the ftp client earlier. When it finds the file, this must be the one to which the ftp client was expecting to write the file contents. So now the client proxy 114 can overwrite that "signature" file with the real file contents, thus completing the operation which the ftp client was led to believe it was performing (i.e., transferring the file contents from FTP server 120 to a particular file in the local storage on the pervasive device).

After completing this step, the client proxy 114 can alert the user that the file has been transferred successfully.

HTTP (Web Page Retrieval)

Figure 6:
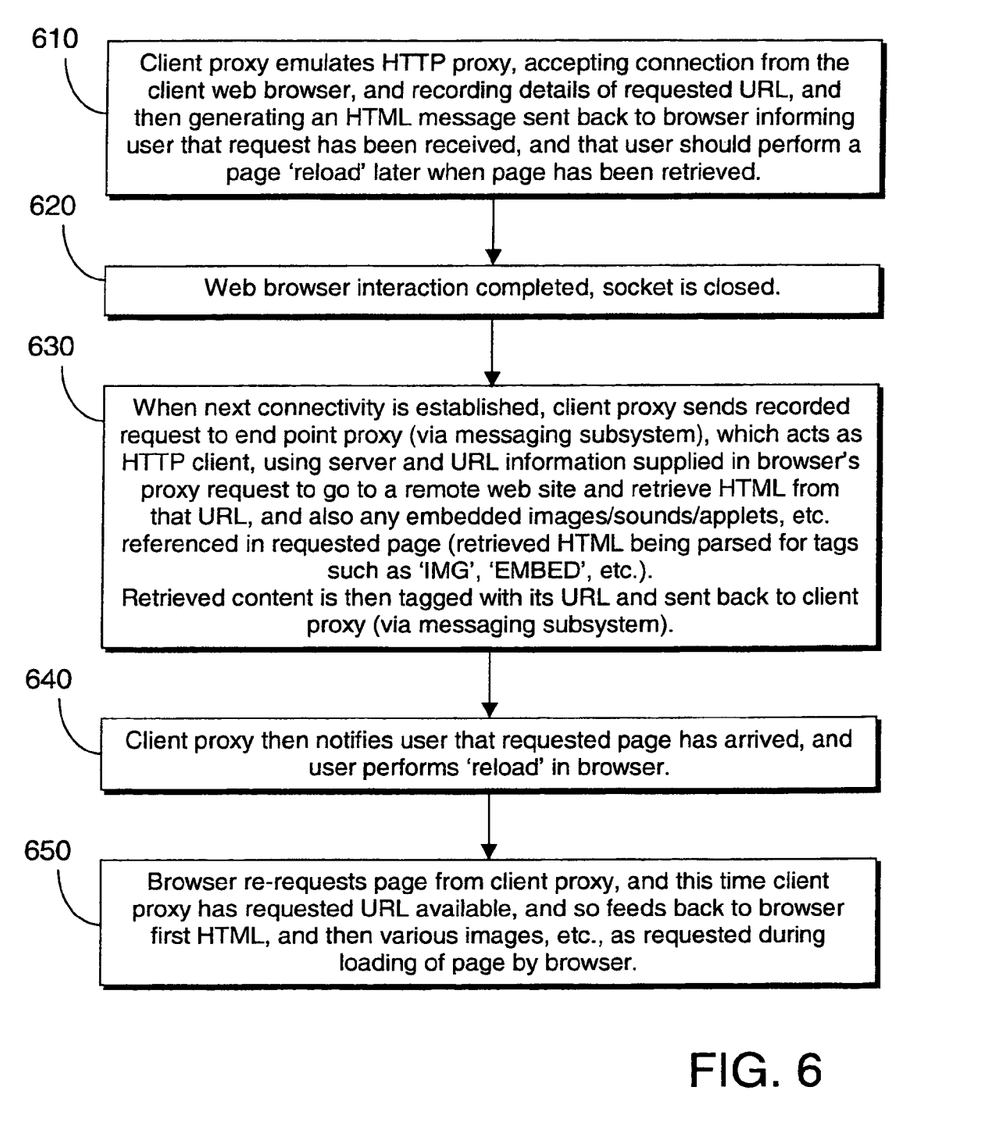
FIG. 6 shows a flow chart illustrating steps performed in an HTTP (web page retrieval) process in the system of FIG. 1.

Referring now to FIG. 6, HTTP (HyperText Transfer Protocol) is likely to be most useful when a user wants to look at a particular URL (Uniform Resource Locator) from a pervasive device, rather than actively 'surf' from link to link. The most common example of this is when a user receives a URL link in an email which the user wants to view.

The web browser application 112 is configured to talk to an HTTP proxy on localhost. As shown at step 610, the client proxy 114 emulates an HTTP proxy, accepting the connection from the web browser 112, and recording the details of the requested URL. It then generates HTML (HyperText Markup Language) content which it sends back to the browser, which the browser will assume came from the remote web site in response to its request. The HTML content is a message informing the user that the request has been received, and that the user should perform a 'reload' on the page later when the page has been retrieved.

As shown at step 620, that completes the interaction with the web browser, so the socket is closed.

The client proxy 114 stores the request into the client messaging function 116 and eventually, as shown at step 630, the link 130 is connected, and the request is transferred to the server messaging function 122, and then on to the end point proxy 124. The end point proxy 124 acts as an HTTP client, using the server and URL information supplied in the browser's proxy request to go to a remote web site and retrieve the HTML from that URL, and also any embedded images/sounds/applets/etc. which may be referenced in the page (the HTML is parsed for tags such as 'IMG', 'EMBED', etc.). This content is then tagged with its URL and sent back to the client proxy 114 (via the messaging subsystem 122 and 116), next time the link 130 is up.

As shown at step 640, the client proxy 114 then notifies the user that the page has arrived using the alert mechanism described above, and the user clicks the 'reload' button on the browser.

As shown at step 650, this causes the browser to re-request the page from the client proxy 114 (which is configured as its HTTP proxy), and this time the client proxy 114 has the requested URL available, and so can feed back to the browser first the HTML, and then the various images, etc., as they are requested during the loading of the page by the browser.

It will be understood that an HTTP 'POST' (generated when a filled-in form is submitted from a web browser) can also be submitted to a remote web site using the same mechanism.

Clearly the approach described above can be used for other protocols than those described above which are observed to be the most commonly used ones from pervasive devices at the present time.

It will be appreciated that the method described above for impermanent connectivity will typically be carried out in software running on processors (not shown) at the client device and at the server, and that the software may be provided as a computer program element carried on any suitable data carrier (also not shown) such as a magnetic or optical computer disc.

It will be understood that the method and arrangement for impermanent connectivity described above provides the following advantages:
client application code does not have to be modified
operation is largely invisible to the client.

What is claimed is:

1. An arrangement for controlling communication between a client application executing on a client unit and an impermanently connected server in a network, comprising:
    at least one client proxy at the client unit, the at least one client proxy operable, when the client unit is not connected for communication with the server, for receiving file transfer protocol (FTP) information from the client application executing on the client unit that requires a server response for the client application to continue operation, for storing the file transfer protocol (FTP) information, for generating a substitute response for the server response to allow the client application to continue operation, and for sending the substitute response to the client application; and
    means for relaying the file transfer protocol (FTP) information from the at least one client proxy to the server responsive to a communications link between the client unit and the server being established, wherein the client proxy comprises:
        means, responsive to receiving a file transfer protocol (FTP) file 'GET' command, for writing a local file at the client unit having a unique signature; and
        means, responsive to the connectivity link between the client unit and the server being established, for obtaining a requested file from the server, for finding the local file at the client unit having the unique signature, and for over-writing the found local file with the obtained requested file.

2. The arrangement of claim 1 further comprising means for notifying a user of the client unit of an outcome of the relaying of said file transfer protocol (FTP) information to the server.

3. The arrangement of claim 1, further comprising server proxy means coupled to the server for cooperating with the client proxy at the client unit to relay said file transfer protocol (FTP) information from the client unit to the server responsive to said connectivity link being established.

4. The arrangement of claim 3 further comprising messaging means coupled between the client unit and the server for relaying said file transfer protocol (FTP) information as messages across the connectivity link responsive to said connectivity link being established.

5. The arrangement of claim 1 wherein the client unit comprises a portable computing device.

6. The method of claim 5 further comprising notifying a user of the client unit of an outcome of the relaying of said file transfer protocol (FTP) information to the server.

7. The method of claim 5 wherein the client unit comprises a portable computing device.

8. A method for impermanent connectivity between a client unit and a server in a network, the method comprising:
    providing a client proxy at the client unit for receiving file transfer protocol (FTP) information to be sent to the server and for which a server response is to be received from the server, for storing said file transfer protocol (FTP) information, and for sending a substitute response for the server response; and
    relaying said file transfer protocol (FTP) information from the client proxy at the client unit to the server responsive to a connectivity link between the client unit and the server being established, wherein the steps of receiving, storing and relaying said information comprises:
        in response to receiving a file transfer protocol (FTP) file 'GET' command, writing a local file at the client unit having a unique signature; and
        responsive to the connectivity link being established between the client unit and the server, obtaining a requested file from the server, finding the local file at the client unit having the unique signature, and over-writing the found local file with the obtained requested file.

9. The method of claim 8 further comprising providing a server proxy coupled to the server for cooperating with the client proxy to relay said file transfer protocol (FTP) information from the client unit to the server responsive to said connectivity link between the client unit and the server being established.

10. The method of claim 8 further comprising providing messaging means coupled between the client unit and the server for relaying said file transfer protocol (FTP) information as messages across the connectivity link responsive to said connectivity link being established.

11. A computer program product, comprising: a computer readable data storage medium storing a computer readable program element for impermanent connectivity between a client unit and a server in a network, the computer program product comprising:

instructions for providing at the client unit, a client proxy for receiving file transfer protocol (FTP) information to be sent to the server and for which a server response is to be received from the server, for storing said file transfer protocol (FTP) information, and for sending a substitute response for the server response; and instructions for relaying said file transfer protocol (FTP) information from the client unit to the server responsive to a connectivity link between the client unit and the server being established, wherein the instructions for providing a client proxy comprises:

instructions, responsive to receiving a file transfer protocol (FTP) file 'GET' command, for writing a local file at the client unit having a unique signature; and instructions, responsive to the connectivity link between the client unit and the server being established, for obtaining a requested file from the server, for finding the local file at the client unit having the unique signature, and for over-writing the found local file with the obtained requested file.

* * * * *